United States Patent [19]

Fritsch

[11] Patent Number: 4,749,350
[45] Date of Patent: Jun. 7, 1988

[54] INJECTION MOLDING MACHINE FOR PLASTIC MATERIAL

[76] Inventor: Rudolf P. Fritsch, Goslarerstr. 58, 7000 Stuttgart 31, Fed. Rep. of Germany

[21] Appl. No.: 95,559

[22] Filed: Sep. 10, 1987

[30] Foreign Application Priority Data

Oct. 31, 1986 [DE] Fed. Rep. of Germany ....... 3637166

[51] Int. Cl.[4] .................... B29C 45/06; B29C 45/07
[52] U.S. Cl. .................... 425/575; 425/451; 425/589; 425/595
[58] Field of Search ............... 425/567, 569, 574–576, 425/589, 590, 594, 595, 450.1, 451, DIG. 221, DIG. 223; 264/328.11

[56] References Cited

U.S. PATENT DOCUMENTS

| | | | |
|---|---|---|---|
| 3,091,810 | 6/1963 | Turner | 425/576 X |
| 3,121,919 | 2/1964 | Turner | 425/576 X |
| 3,224,043 | 12/1965 | Lameris et al. | 425/576 X |
| 3,310,839 | 3/1967 | Son et al. | 425/576 X |
| 3,335,464 | 8/1967 | Schwartz | 425/574 X |
| 3,609,815 | 10/1971 | Rudolf et al. | 425/576 |
| 3,889,448 | 6/1975 | Russell | 425/575 X |
| 3,915,608 | 10/1975 | Hujik | 425/576 X |
| 4,090,837 | 5/1978 | Balevski et al. | 425/595 X |
| 4,128,384 | 12/1978 | Albright | 425/575 X |
| 4,133,622 | 1/1979 | Braun | 425/574 X |
| 4,309,164 | 1/1982 | Egger et al. | 425/451 X |
| 4,540,359 | 9/1985 | Yamazaki | 425/589 X |

FOREIGN PATENT DOCUMENTS

1136819 9/1962 Fed. Rep. of Germany .
1267418 5/1968 Fed. Rep. of Germany .
119527 2/1983 Fed. Rep. of Germany .

Primary Examiner—Richard L. Chiesa
Attorney, Agent, or Firm—Frishauf, Holtz, Goodman & Woodward

[57] ABSTRACT

An injection molding system for processing thermoplastics and thermosetting plastics has at least one injection unit (1), which is axially movably supported on a support frame and is coupled to positioning means (15) generating the axial movement, and also has at least one turntable (2) supporting a plurality of injection molds (8) disposed in a ring. The turntable is supported on a movable cart (23) such that it is rotatable about a vertical axis (9). The injection unit is provided with axially movably supported rails (19), which have devices for releasable coupling to a mold carrier (28), carrying the particular mold (8), of the turntable (2) and are connected to clamping means (20, 21). The lower part (8a) of the injection molds is durably secured to the mold carrier (28) of the turntable (2), while the upper part (8b) of the mold is connected to the lower part (8a) by means of releasable first closure means (41), and on its injection cylinder the injection unit (1) has its own mold engagement plate (16), with which two releasable closure means (58) for the upper mold part (8b) are associated, these means being operative when the rails (19) are coupled to the mold carrier (28) and the first closure means (41) are released. The positioning means (15) and the clamping means (20, 21) of the injection unit (1) and the aforementioned closure means (41, 58) are coupled to and controlled by a control unit (64).

16 Claims, 7 Drawing Sheets

INJECTION MOLDING MACHINE FOR PLASTIC MATERIAL

The present invention relates to an injection molding machine for injection of plastic material, such as thermoplastic, thermosetting plastic or the like, in which an injection molding unit is mounted for selective engagement with a plurality of molds which are supported on a mold carrier which, in turn, is mounted on a turntable, the turntable being secured to a carriage which is selectively placeable in operative association with the injection molding unit, so that, for example while one carriage is being used and has plastic parts injected therein, the molds, or, otherwise, is available for separate handling.

BACKGROUND

A known injection molding machine disclosed in German Pat. No. 1 136 819, for non-metal plastic materials, in particular thermoplastic and thermosetting plastic, has an injection unit having an injection cylinder and an incrementally indexable turntable supporting a plurality of molds. The plane of the table is parallel to the injection cylinder axis, and the arrangement is such that the injection cylinder and the turntable are supported so that either one of the two parts is displaceable relative to the other, or both parts are displaceable toward or away from one another in the direction of the plane of the table. The particular mold located in an operating position at a given time, when contacting the injection nozzle of the injection cylinder, acts directly in the valve opening direction upon a valve that closes the injection nozzle.

Since in this machine the individual molds always remain with both mold halves on the turntable, each of the molds has to have its own associated mold closing mechanism, which is located on the turntable. This is expensive, and it is problematic in terms of the space required for it. Furthermore, the injection nozzle of the injection unit must be aligned exactly with the feed supply, or sprue opening of the mold to be filled; this means that the turntable and the injection unit must have highly accurate mutual guidance. In practical terms, this can be achieved only by locating the carriage that supports the turntable and the injection unit on a common frame or support, which has suitable precision guide means. In principle, therefore, such an injection molding machine has only a single mold turntable, which is associated with the injection unit and cannot be operationally disassociated from the injection unit. Accordingly, a mold exchange must be done on the turntable itself, which necessitates shutting down the entire injection molding machine.

This kind of interruption in operation caused by a mold change is a hindrance to fully continuous, 24-hour operation of the injection molding machine, especially whenever relatively small quantities of different molded articles are to be produced in succession. Each interruption of a continuous injection molding process moreover unavoidably produces increased rejects and scrap.

THE INVENTION

It is an object to provide an injection molding machine which is highly flexible, and much more versatile than machinery of the prior art, and which does not require a continued structural connection, for example in the form of a common frame or the like, between the injection molding unit as such, and a carrier, which may be a turntable for the molds.

Briefly, a group of elongated coupling elements in the form of a rail or rod elements, are provided which are longitudinally shiftable, for example by a pneumatic or hydraulic cylinder-piston arrangement. The molds themselves are retained on a mold carrier which is located on a turntable. The mold carrier and the coupling rails or bolts can be interconnected and locked together. The molds themselves are formed as two-part elements which can be releasably coupled together. The injection molding unit is movably supported on a support frame, and includes a mold engagement plate, through which the injection nozzle extends. A control unit, which may include a sequencing unit or the like, controls an operating element to move the injection molding unit, the cylinder-piston structure for shifting and clamping the engagement bolt or rails with the mold, and, further, to provide for coupling the rails or bolts with the mold and then clamping them into position, while providing engagement pressure for the injection unit and its mold engagement plate so that the requisite pressure to carry out an injection molding step is obtained. The turntable which retains the mold carrier, and hence the mold itself, is mounted on a carriage which can be selectively placed in operative association with the frame supporting the mold unit, or selectively moved away, for example on rails or the like, or in accordance with a predetermined induction path, for exchange of molds, if desired, which another carriage with other mold elements is placed in operative position with respect to the injection unit.

The system has the advantage that the mold inlet will always be precisely aligned with the injection nozzle by coupling the mold via the connecting rails or bolts; no common connection, however, for example in the form of a common frame between the support for the mold and for the injection unit is necessary. The bolts or rails of the injection unit are self-centering in fitting bores or openings of the mold carrier on the turntable. Thus, excessive accuracy and minimum tolerances with respect to the alignment of the mold carrier and of the injection molding unit in advance of coupling the rails to the mold is not necessary. This permits the arrangement in which the turntable carrying the injection molds is exchangeable, for example by mounting it on movable carriages so that the necessity to change molds on the turntable itself while in association with the injection unit, is eliminated.

In accordance with the preferred embodiment, the arrangement is such that a remote control system is associated with the carriage, or cart, carrying the turntable. By means of the remote control system, the turntable can be shifted automatically to a work station with respect to the injection unit. Positioning means which are optionally located in the work station and lock the carriage in a stationary fashion are triggerable by means of this remote control system as well. The carriage can suitably be moved along predetermined paths between a storage or holding station and the work station in a programmed manner, so that the mold change can be performed remote from the injection unit, in the storage or holding station in which the various molds are kept on hand. In this way, particularly short new set up time periods are possible when the forms are exchanged, while on the other hand the mold change in no way restricts the operation of the injection unit.

DETAILED DESCRIPTION OF THE DRAWINGS

Figure 1:
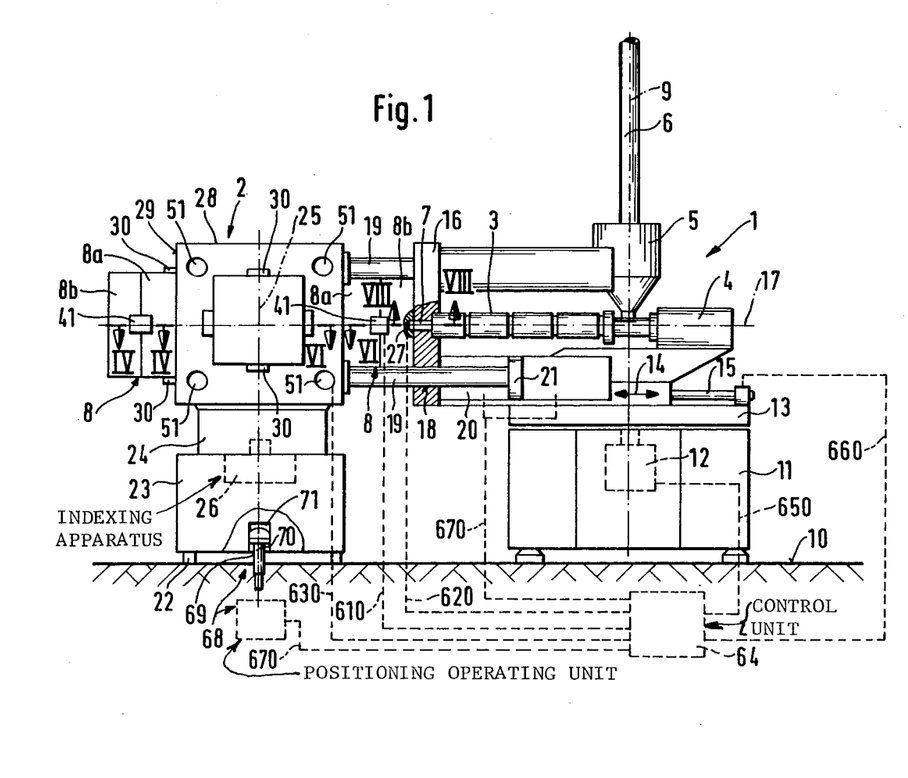
FIG. 1 is a side view, in schematic form, of an injection unit and a mold turntable of an injection molding system according to the invention, seen in the coupled state.
Figure 2:
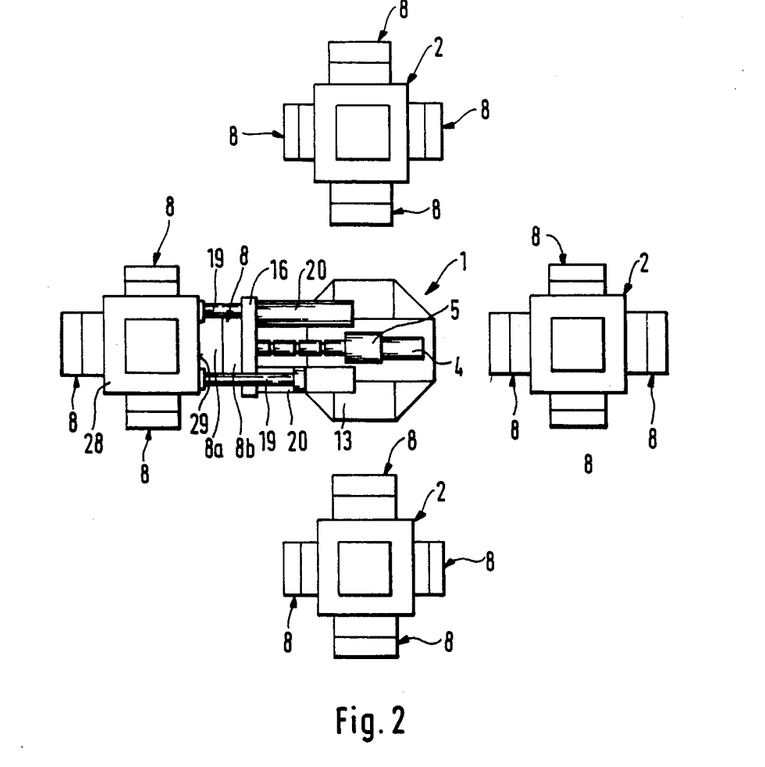
FIG. 2 is a plan view on the injection molding system of FIG. 1, showing four mold turntables located in a ring surrounding the injection unit.

The injection molding system shown in FIGS. 1 and 2 has an injection unit 1 and four mold support turntables 2, distributed symmetrically in circles circumferentially around the injection unit. The injection unit 1 is an injection assembly of a type known per se, with a worm-pre-plastification arrangement, of the type typical for the processing of thermoplastics, thermosetting plastics, elastomers and such materials. It has an injection cylinder 3, in which at least one plastification and transport worm, not shown in further detail, revolves. The drive assembly of the worm is shown at 4. Discharging into the injection cylinder 3 is an inlet funnel 5, to which plastic granulate is supplied in a known manner via a transparent hose 6. On its front end opposite the drive 4, the injection cylinder 3 has an injection nozzle 7, by way of which plastified flowable plastic material can be injected into an associated two-part mold 8.

The injection unit 1, the injection cylinder axis of which is located in a horizontal plane, is supported such that it is rotatable about a vertical axis 9 on a support frame 11 affixed to the floor 10. A rotation and indexing apparatus 12 that imparts a step-wise or indexing rotational movement to the injection unit is located in the support frame 11. The rotation and indexing apparatus 12 enables pivoting the injection unit, as shown in FIG. 2, by 90° at a time about its vertical axis 9, in such a way that its injection cylinder 3 is centrally aligned with one of the turntables 2. After this indexing movement has been executed the injection unit 1 is locked in position, by a suitable interlock, as well known, in the particular operating position by means of the rotation and indexing apparatus 12.

In accordance with a feature of the invention, the injection unit 1 is supported on a turntable 13 coupled to the rotation and indexing apparatus 12 such that it is capable of reciprocation in a horizontal plane in the direction of the double arrow 14 (FIG. 1). To this end, it is coupled to a hydraulic cylinder 15, forming a positioning means, which on its other end is anchored in stationary fashion on the turntable 13 and permits imparting a longitudinal movement in the axial direction of the injection cylinder 3 to the injection unit 1.

A vertical mold engagement plate 16 that is located on the injection unit 1 is provided surrounding the forward end of the injection cylinder 3 and the injection nozzle 7. The mold engagement plate 16 has four through bores 18, distributed point-symmetrically to the longitudinal axis 17 of the injection cylinder 3, and four cylindrical guide rods or rails 19 are supported in a longitudinally displaceable manner in these through bores 18. Each of the rails 19 protrudes into a hydraulic mold closing cylinder 20 of the injection unit 1, which is located behind the mold engagement plate 16 and in a manner to be described below forms part of the clamping means exerting the closing force for the molds 8 and includes a piston 21 to which the respectively associated rail 19 is connected.

Each of the turntables 2 associated with the injection unit 1 described has a carriage, or cart 23 that is movable over rollers 22 on the floor 10 and on which a table plate 24 is supported such that it is rotatable step-wise, or incrementally, about a vertical axis 25. The table plate 24 to this end is coupled to a rotary indexing device, which is indicated at 26 and is accommodated in the cart 23, and the indexing device permits indexing the table plate 24 onward about the axis of rotation by 4×90°. In the operating position attained, in which one of its molds 8 has its feed supply opening 27 (FIG. 1) aligned with the injection nozzle 7 of the injection unit 1, the indexing device 26 enables locking the table plate 24 in a stationary fashion with respect to the cart 23.

Figure 6:
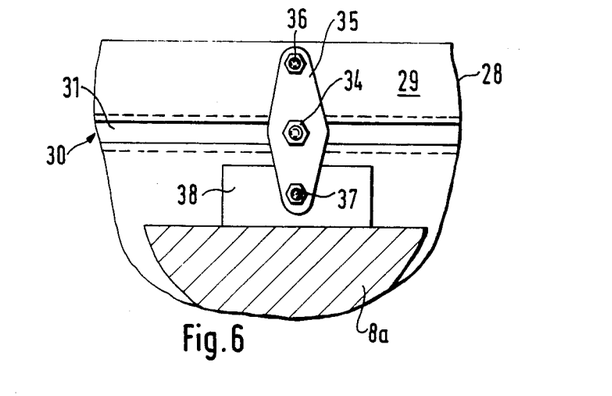
FIG. 6, in a view taken along the line VI—VI of FIG. 7, seen partly in section and on a different scale, shows the fastening means of a lower mold half on the associated mold carrier of the turntable of FIG. 1.
Figure 7:
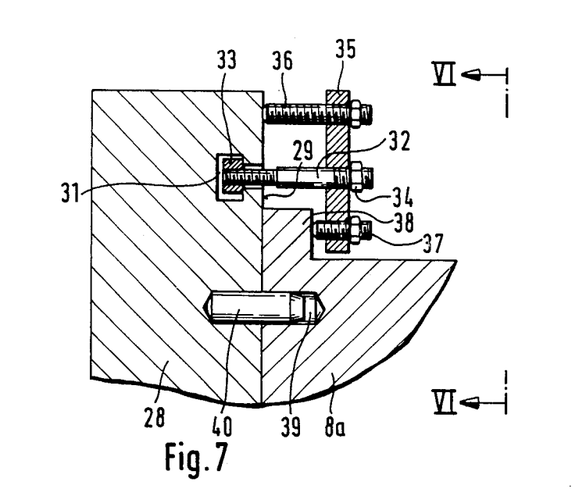
FIG. 7 is a side view, in section taken along the line VI—VI of FIG. 1, of the fastening means of FIG. 6.

Located on the table plate 24 is a mold carrier 28, substantially in the form of an approximately block-shaped housing, which has four flat, vertical mold carrier faces 29 facing one another in pairs. A two-part injection mold 8 is durably secured to each of the mold carrier faces 29 by means of detachable fastening means 30, best seen in FIGS. 6, 7.

Two parallel undercut grooves 31 of T-shaped cross section, extending transversely, are formed on the mold carrier 28 in each of the mold carrier faces 29. Protruding into these grooves 31 is at least one clamping bolt 32, which is screwed into a slide plug 33 that is displaceable in the transverse grooves 31. The clamping bolt 32 is connected via a nut 34 with a clamping claw 35, which at the upper end (FIG. 7) is braced against the mold carrier face 29 via a set screw 36 and at its lower end is braced via a second set screw 37 against an integrally molded edge strip 38 of the lower mold part 8a, which together with an upper mold part 8b forms the two-part mold 8. Alignment pins 40 of the mold carrier 28 that engage appropriate bores 39 of the lower mold part 8a assure the precisely correct position of the mold 8 on its respective mold carrier face 29. The fixation of the lower mold part 8a is effected by suitable tightening of the nuts 34 via the clamping jaws 35, as is readily apparent from FIGS. 6, 7.

The fastening means 30 of the individual lower mold parts 8a remain operative during the operation of one turntable 2, so that the particular lower mold part 8a is durably secured to the associated mold carrier face 29 and thus to the mold carrier 28.

Figure 4:
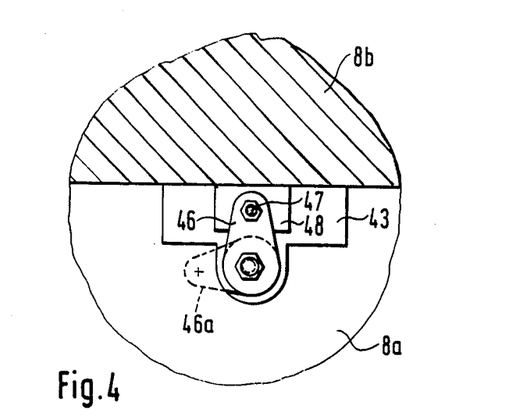
FIG. 4 is a side view taken along the line IV-V of FIG. 5, partly in section, of the first closure means of a mold of the turntable according to FIG. 1.
Figure 5:
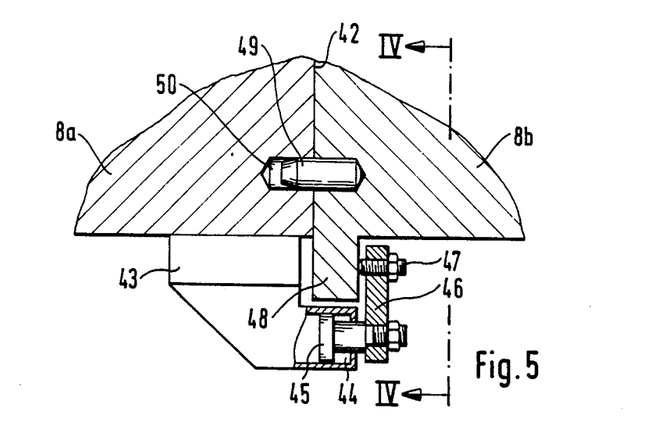
FIG. 5 is a side view of the closure means of FIG. 4, in a sectional view taken along the line IV—IV of FIG. 1.

The two mold halves formed by the lower mold part 8a and the upper mold part 8b containing the feed opening 27 are releasably connected to one another by first closure means 41, the structure of which is shown in detail in FIGS. 4, 5.

On the lower mold part 8a, on opposite sides in the vicinity of the mold separating line 32 (see FIG. 5), holders or securing means 43 are secured, each of which has a rotatable and axially movable cylinder 44, the piston 45 of which is screwed to a clamping claw 46, which in turn is braced via a set screw 47 against an edge strip 49 of the upper mold part 8b. The exact mutual position of the lower mold part 8a and the upper mold part 8b is assured by centering pins 49, which are inserted into the upper mold part 8b and fitted into corresponding bores 50 on the lower mold part 8a.

The clamping claw shown in the clamping state in FIG. 5 is shown in the released state in dashed lines at 46a in FIG. 4. In order to release the first closure means 41 and thus to enable separating the two mold parts 8a, 8b from one another, by suitable action of the rotatable and axially movable cylinder 44 via the pistons 45, the clamping claw 46 is moved axially forward on each side of the mold, beginning at the position shown in FIG. 5, and then pivoted about 90° into the position 46a of FIG. 4.

Figure 3:
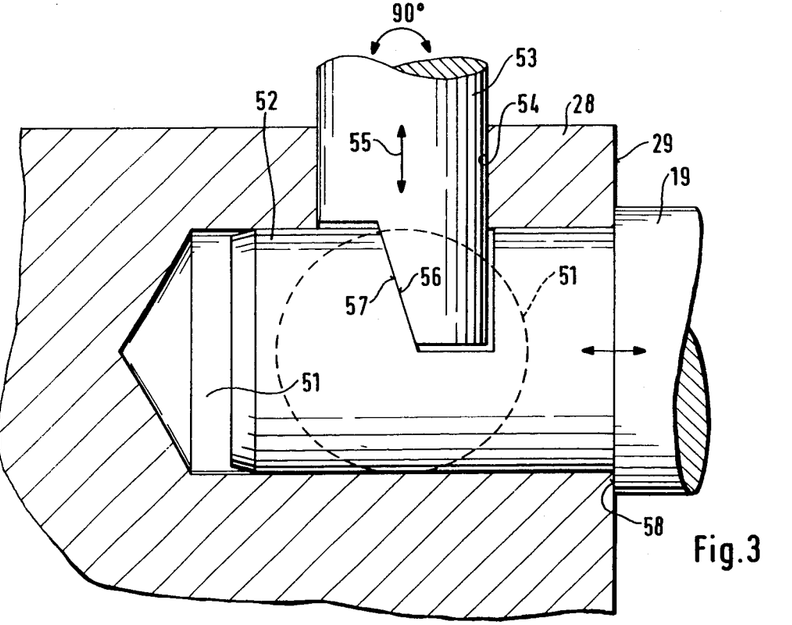
FIG. 3 is a fragmentary side view in axial section, on a different scale, of a fast connect-disconnect coupling for a rail of the injection unit of FIG. 1.

In the vicinity of each of the mold carrier faces 29, in the manner shown for example in FIG. 1. four parallel receiving bores 51 for the rails 19 of the injection unit are provided on the mold carrier 28. As FIG. 3 shows, the arrangement is such that the receiving bores 51 of adjacently located mold carrier faces 29 that form a right angle with one another intersect one another in pairs. In the vicinity of the intersection of two such receiving bores 51, coupling devices for the rail 19. which is inserted with a self-centering protrusion 52 in one of the receiving bores 51, are provided, these coupling devices comprise a locking element, in the form of a cylindrical locking bolt 53. which is axially shiftable (arrow 55) and rotatable about 90° in a corresponding bearing bore 54 of the mold carrier 28. The associated operating mechanism that imparts this movement to the locking bolt 53 is not shown in FIG. 3, for the sake of simplicity.

On its forward end protruding into the bores 51, each locking bolt 53 has a wedge face 56, with which it cooperates with a corresponding oblique locking face 57 on the centering protrusion 52 of the associated rail 19.

As is readily apparent from FIG. 3, when the locking bolts 53 are retracted the rails 19 can be inserted into the receiving bore 51 associated with the respective mold carrier face 29 with their centering protrusions, which taper to a point at the forward end and are thus self-centering, until contacting an annular shoulder 58 on the mold carrier face 29. The locking bolts 53, axially advanced into the locking position shown in FIG. 3, then lock the associated rail 19 on the mold carrier 28, via the wedge face 56 that cooperates with the respective locking face 57. Because of the oblique position of the faces 56 and 57, axial bracing and thus play-free coupling of the the rails 19 is thereby effected.

In order to be able to couple the associated mold carrier face 29 after the further indexing of the turntable by 90°, the locking bolts 53 need merely be rotated beforehand by 90° with respect to the position of FIG. 3, so that once again they cooperate with the rails 19 in the manner described.

The locking bolts 53 together with the faces 56, 57 form a fast closure, or rapid connect-disconnect coupling.

Finally, in the vicinity of their upper part 8b, each of the molds 8 has two closure means that enable releasable connection of the upper mold part 8b with the mold engagement plate 16 of the injection unit 1. These second closure means 58 are shown in FIGS. 8 and 9.

Two horizontal undercut securing grooves 59 of T-shaped cross section are formed on the mold engagement plate 16 above and below the upper mold part 8b, and in them at least one rotatable and axially movable cylinder 62 is anchored by means of a slide plug 60 and a screw bolt 61. The piston 63 of each rotatable and axially movable cylinder 62 is screwed to a clamping claw 64, which is braced via a set screw 65 against an edge strip 66 of the upper mold part 8b.

Figure 8:
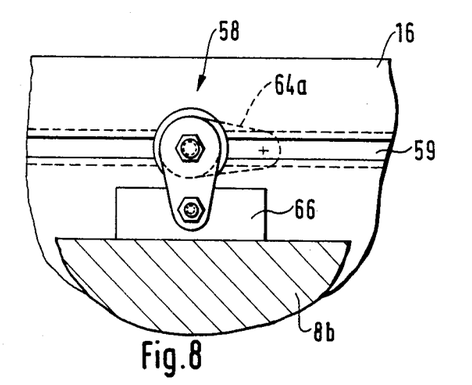
FIG. 8 is a side view taken along the line VIII—VIII of FIG. 9, on a different scale, of two closure means of the mold coupled to the mold engagement plate of the injection unit of FIG. 1.
Figure 9:
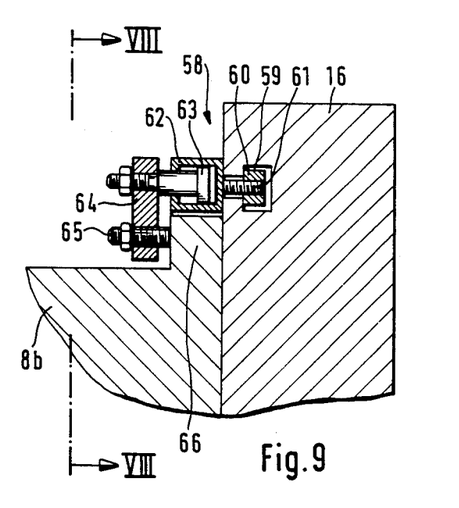
FIG. 9 shows the closure means of FIG. 8, in a sectional side view taken along the line VIII—VIII of FIG. 1.

Beginning at the band position shown in FIG. 9, in which the upper mold part 8b is rigidly clamped to the mold engagement plate 16, the closure means 58 can be tripped by axially advancing the clamping piston 63 and then rotating it by 90°, so that the clamping claw 64 assumes the position shown in broken lines at 64a in FIG. 8, in which it releases the edge strip 66.

The first closure means 41, the second closure means 58 and the operating element of the locking bolts 53 are connected via lines 610, 620, 630 (FIG. 1) with a programmable control unit 64, to which the rotation and indexing apparatus 12 for the injection unit 1, its hydraulic positioning cylinders 15 and mold closing cylinders or clamping means 20 are connected via lines 650, 660, and 670. The operating element 68 of a positioning device 69 is also coupled to the control unit 64 via a line 670. The positioning device 69 enables stationary locking of a turntable 2 by the advancement of an indexing bolt 70 into a suitable bore 71, toward the bottom, of a cart 23 that is in a respective operating position (FIG. 1) with respect to the injection unit 1.

Operation, with Reference to FIGS. 1 and 2

Once a turntable 2, with its cart 23, has been moved to the work station of FIGS. 1, 2 and there positioned properly by means of the indexing bolt 70, the mold carrier 28 of the turntable 2 is rotated, by appropriate actuation of the indexing device 26, in such a way with respect to the injection unit 1 that the particular mold 8 selected is aligned with its feed supply opening 27 toward the injection nozzle 7 of the injection unit 1, in the manner shown in FIG. 2. Under automatic control by the suitably programmed control unit 64, the injection unit 1 is now moved forward, beginning at a retracted position as compared with FIG. 1, toward the mold engagement plate 16 by the hydraulic positioning cylinder. The mold closing cylinders 20 thereupon move the rails 19 forward until they engage the receiving bores 51 of the mold carrier 28 with their centering protrusions 52 (see FIG. 3), where they are then locked by the locking bolts 53.

Pressure is now exerted in the opposite direction upon the mold closing cylinders 20 forming the clamping means, so that the mold 8 is clamped in the precisely correct position, with the required mold closing pressure, between the mold engagement plate 16 and the associated mold carrier face 29, in such a way that the injection nozzle 7 is exactly aligned with the feed supply opening 27 the upper mold part 8b.

Now the second closure means 58 (FIGS. 8, 9) are made operative by corresponding actuation of the rotatable and axially movable cylinders 62, so that the upper mold part 8b is coupled rigidly and precisely in the correct position to the mold engagement plate 16. The first closure means 41 (FIGS. 4, 5) are tripped by corresponding action upon the rotating and axially movable cylinders 44. with the result that the two mold parts 8a, 8b are uncoupled from one another.

After the coupling of the usual supply devices to the form 8, which is done via rapid connect disconnect means, not shown in detail, plastified plastic material can now be injected via the injection nozzle 7 into the mold 8.

Once the holding time has elapsed, the mold 8 is opened by retracting the injection unit 1 toward the right—with respect to FIG. 1—by corresponding triggering of the mold closing cylinders 20, the rails 19 being rigidly connected to the mold carrier 28 and thus retained in stationary fashion. Because of the closed second closure means 58, the upper mold part 8b is carried along with the mold engagement plate 16, while the lower mold part 8a remains connected to the mold carrier 28, via the fastening devices 30.

The further sequence of operation for producing the desired number of injection molded articles is of the kind typical for such injection molding machines; the upper mold part 8b is moved back and forth via the mold engagement plate 16 to close and open the mold.

When the required number of injection molded articles has been made, the injection unit 1 can be reset to a different mold 8 without interrupting the operation. To this end, in reverse order from what has been described above and in each case controlled by the control unit 64, the first closure means 41 is closed on the mold 8 used thus far and the second closure means 58 is opened. The locking bolts 53 are then retracted, which releases the couplings of the rails 19 to the mold carrier 28. The mold closing cylinders 20 now retract the rails 19. At the same time the injection unit itself retracts in the direction of the arrow 14, so that the mold engagement plate 16 and the rails 19 move completely free of the turntable 2.

The turntable 2 can now either bring another mold 8 into the operating position shown in FIG. 1, via its indexing device 26, or—depending on the programming—the injection unit 1 is pivoted from the position shown in FIG. 2 by 90° or a multiple of this angle in such a way that it is aligned toward a corresponding mold 8 of another of the turntables 2 that surround it.

The turntables 2 carrying molds 8 that are as yet unused can be moved on the floor 10 without impairing the continuous operation of the injection unit 1, after the associated operating element 68 for its positioning means has been suitably triggered.

Figure 10:
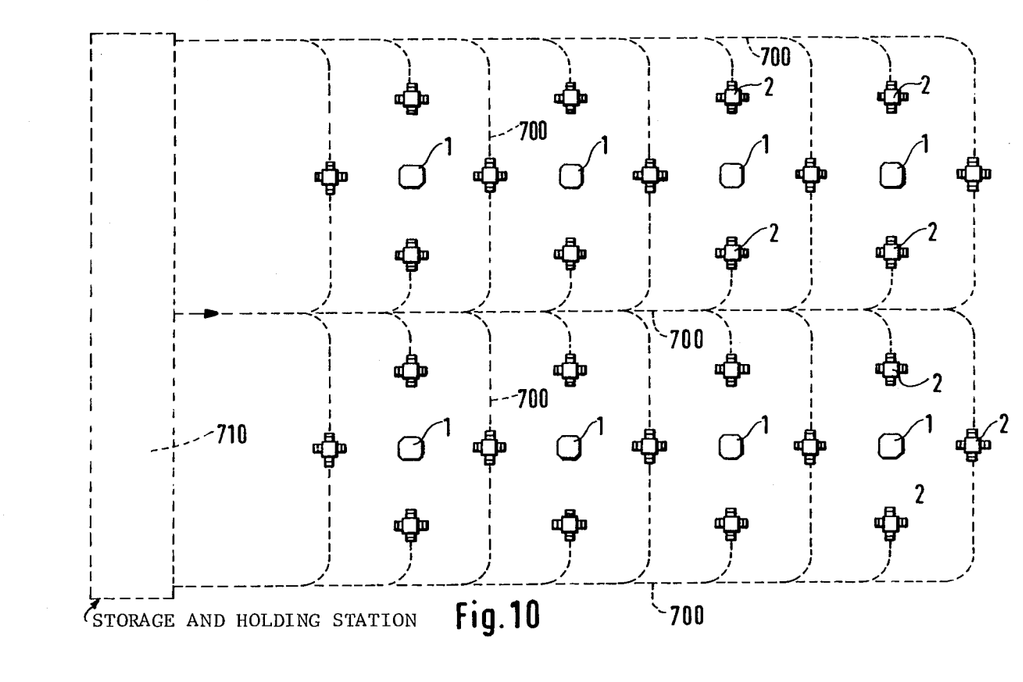
FIG. 10, in a schematic plan view on a different scale, shows an expanded embodiment of the injection molding system of FIG. 2.

In accordance with a feature of the invention, each of the carts 23 has a remote control system associated with it, which enables moving the carts 23 along predetermined paths 700 (FIG. 10). The paths 700 can either be track systems located in the floor 10 or, preferably, can be formed by induction loops laid in the floor 10, which determine the path of movement of each of the carts 23, which are equipped with a suitable sensor. Remote control systems of this kind, and in particular inductive remote control systems, are known per se for various applications and so need not be described in detail here.

The movement paths 700 of the system shown in FIG. 10 are designed such that they either originate at or lead into a common storage or holding station 710. If a mold change is now to be performed for one of the mold carriers 28, then the corresponding cart, after being unlocked, is moved via the remote control system along the associated predetermined movement path 700 into the storage or holding station 710, where by releasing the corresponding fastening devices 30 the molds 8 are removed from the mold carrier 28 and replaced with other molds 8. Under remote control by the remote control system, the cart 23—or some other cart 23—then moves back again into a work station for the associated injection unit 1, which in turn remains stationary with its support frame 11.

As FIG. 10 shows, in this way fully-automatic computer-controlled injection molding systems can be designed with a multiplicity of injection units 1, arranged in rows and columns, and mold turntables 2 surrounding them in a ring. Each mold carrier need not carry only four molds 8 as described in the exemplary embodiment. Instead, exemplary embodiments can be provided in which a greater or lesser number of molds 8, in each case arranged in a ring, is associated with each turntable 2. The associated injection unit 1 is thus inherently capable of being indexed about its vertical axis 9 that extends through the inlet funnel 5.

An injection molding system can advantageously be arranged such that the injection unit 1 is rotatable about a vertical axis 9 on its support frame 11, and is coupled to a rotation apparatus 12 that imparts an incremental rotation or indexing to it; surrounding the injection unit 1 in a ring is at least one additional work station having its own turntable 2, the molds 8 of which are associated with the correspondingly rotated injection unit 1 in selective fashion.

This kind of injection molding system enables fully continuous 24-hour operation even when relatively small quantities of different injection molded articles are to be manufactured in succession. Even if the time available for manufacture of a predetermined quantity of some particular injection molded article does not match the shift period or normal operating period of an injection unit, there is no need whatever for building up inventory merely to keep working for the full shift. Instead, the injection unit 1 is simply pivoted toward the mold turntable 2 located in the next work station and coupled via its rails 19 to the mold carrier 28 of the injection mold 8 selected there, while the turntable 2 carrying the mold 8 used until then is either indexed over to a different mold 8 or moved to the storage and holding station and replaced with a turntable 2 carrying other molds 8.

This injection molding system enables program-controlled full automation of the entire sequence of operation, including mold changing, without requiring intermittent shut-down of the injection unit 1, which like the interruption of any continuous process is associated with rejects and waste. Since the injection unit 1 can thus operate from the monomer up to a finished injection molded article "in one heat", there is a considerable savings of energy as compared with a mode of operation in which intermittent shut-down of the injection unit 1, for example in order to change the mold 8, is necessary. At the same time, there is a considerable increase in quality of the injection molded articles.

The molds 8 for the particular injection units 1 are immediately available. No mold change or new set up needs to be done on site at the injection unit; this work is shifted to the storage and holding station, which is set up especially for these tasks. Since the quantities produced with a particular mold 8 can readily be matched to the particular amount ordered, and no "inventory building" needs to be done, there is automatically a lesser tie-up of capital, as well as a corresponding savings in terms of storage space and of the distances that the injection molded articles must be transported.

The coupling devices of the self-centering rails 19 are advantageously designed as rapid connect-disconnect couplings 53, 56, 57, and the fact that each rapid coupling is associated with two mold carriers 28, located beside one another, of one turntable 2 provides further simplification.

Another advantage is attained if each mold carrier 28 has bores 51, arranged for receiving the ends of the rails, and locking elements 53 that are insertable into the bores and are lockable in a form-locking manner with corresponding locking faces 29 on the ends of the rails 19. In constructional terms this can be accomplished by providing that bores 51 of adjacent mold carriers 28 intersect one another in pairs, and that the locking elements 53 are formed as locking bolts supported such that they are both longitudinally displaceable and rotatable about a predetermined angle.

The clamping means, finally, may be mold closing cylinders 20 actuated by pressure medium, the pistons 21 of which are connected to the rails 19, so that additional mechanisms or devices especially for mold closure are unnecessary.

Various changes and modifications may be made, and features described in connection with any one of the above embodiments may be used with any of the others, within the scope of the inventive concept.

I claim:

1. Injection molding machine system for plastic material having
    a stationary support frame (11);
    an injection unit (1) including a plastic material supply cylinder (3) and an injection nozzle (7);
    support means (12) for supporting the injection unit on the stationary support frame while permitting longitudinal movement of the injection unit with respect to the support frame;
    operating means (15) coupled to the injection unit and supported on the frame for moving the injection unit on the frame (11);
    mold support means (23) positionable adjacent the frame (11);
    a turn-table (2) rotatably located on the mold support means for rotation about a vertical axis;
    a plurality of two-element injection molds (8, 8a, 8b) located on the turn-table, said two elements forming an upper (8b) and a lower (8a) injection mold element;
    indexing means (26) coupled to the turn-table for positioning a selected one of the injection molds in alignment with the injection nozzle (7) of the injection unit (1) to permit, upon longitudinal movement of the injection unit, engagement of the injection nozzle with an inlet opening of a selected injection mold for injection of plastic material therein;
    said machine system comprising, in accordance with the invention
    (a) means for releasably engaging a selected injection mold (8) with the injection unit (1) including
        a mold carrier (28) retaining the injection molds (8) on the turn-table;
        longitudinally shiftable elongated coupling means (19) coupling the injection unit (1) and the mold carrier (28);
        interconnecting means (52,57) on said mold carrier and on the elongated coupling means for releasable engagement and locking of one end of the coupling means with the mold carrier (28);
        shifting and clamping means (20,21) for longitudinally shifting the elongated coupling means (19) toward and away from the mold carrier and for clamping said coupling means to the injection unit;
    (b) means for releasably retaining said two mold elements (8a, 8b) of the injection molds (8) in position including
        first securing means (41, 43–48) for releasably securing the lower injection mold element (8a) to the upper injection mold element (8b); and
        additional securing means (31–38) for releasably securing the lower injection mold element (8a) on the associated mold carrier (28);
    (c) means for locking the injection mold unit (1) to the upper injection mold element (8b) including
        a mold engagement plate (16) secured to the supply cylinder (3) of the mold injection unit (1);
        second securing means (58, 59–66) coupling the upper injection mold element (8b) said engagement plate (16) and operating for effecting coupling of the lower mold element (8b) and the engagement plate when said first securing means (41) is uncoupled and the elongated coupling means (19) are interlocked with said mold carrier (28); and
    (d) control means (64) controlling respective operation of said operating means (15), shifting and clamping means (20,21), the first securing means (41) and the second securing means (58) for
    moving said injection unit (1) by said operating means (15) from a rest position towards a turn-table (2);
    for moving said elongated coupling means (19) by said shifting and clamping means (20,21) from a withdrawn position towards the mold carrier (28) and in engagement with the mold carrier;
    for engaging and securing said second securing means (58) while rendering releasable said first securing means (41),
    and, after said moving and positioning, controlling the shifting and clamping means (20,21) to press and clamp the mold engagement plate (16) of the injection unit (1) against the injection mold (8) and to press together the mold elements (8a, 8b) of the injection mold (8) with an engagement and clamping pressure required for injection molding of molding material by said molding unit (1); and
    wherein the mold support means comprises a movable cart (23) independent of said support frame (11).

2. The system of claim 1, wherein the turn-table (2) is replaceably associated with the injection unit (1).

3. The system of claim 1, including a remote control system controlling the cart (23) carrying the turn-table which, in turn, carries the mold (8);
    said remote control system controlling the cart for moving to a work station adjacent the injection unit (1).

4. The system of claim 3, further including predetermined guide means (700) permitting movement of the cart (23) in predetermined paths between a holding and storage station (710) and the work station, said remote control means controlling movement of said carts between said stations.

5. The system of claim 3, further including cart positioning and locking means (68,70) locking the cart (23) in position at the work station.

6. The system of claim 5, wherein said locking and positioning means are controlled for locking and positioning the cart by said remote control means.

7. The system of claim 1, wherein said support means (12) supporting the injection unit (1) is a rotatable, indexable support means, for rotating the injection unit (1) about a vertical axis (9);

and wherein a plurality of carts (23) are provided, defining at least one further cart, each further cart having a turn-table (2) and injection molds (8) thereon, said support means indexing said injection unit (1) for selective engagement with a selected mold on a selected cart.

8. The system of claim 7, wherein said longitudinally shiftable elongated coupling means comprises rods or rails;

and wherein the shifting and clamping means comprises pressure fluid operated piston-cylinder combinations, in which the pistons (21) are coupled to said rods or rails for positioning, and pressure-clamping said rods or rails in position.

9. The system of claim 1, wherein the longitudinally shiftable elongated coupling means (19) comprise self-centering rods or rails (19);

and wherein the interconnecting means comprise rapid connect-disconnect couplings (53,56,57).

10. The system of claim 9, wherein at least two molds (8) are adjacently located on the turn-table (2) of a cart;

and wherein each rapid connect-disconnect coupling is associated with two respectively adjacently placed molds (8).

11. The system of claim 9, wherein the mold carrier (28) is formed with bore openings (51) to receive the rods or rails (19);

and wherein the rapid connect-disconnect couplings comprise locking elements (53) engageable in said bores or openings (51), and formed with locking surfaces (57), and wherein the rods or rails are formed with matching locking surfaces engaging the locking surfaces of the locking elements (53).

12. The system of claim 11, wherein two molds (8) are adjacently located on the turn-table (2) of a cart;

and wherein each rapid connect-disconnect coupling is associated with two respectively adjacently placed molds (8);

each one of the molds (8) being formed with said bore openings (51), the bores of adjacently positioned molds intersecting, in pairs;

and wherein the locking elements comprise longitudinally shiftable and angularly rotatable locking bolts (53).

13. The system of claim 1, wherein said shifting and clamping means comprises fluid pressure operated cylinder-piston combinations coupled to said elongated coupling means.

14. The system of claim 13, wherein said longitudinally shiftable elongated coupling means comprises rods or rails;

and wherein the shifting and clamping means comprises pressure fluid operated piston-cylinder combinations, in which the pistons (21) are coupled to said rods or rails for positioning, and pressure-clamping said rods or rails in position.

15. The system of claim 13, wherein the mold carrier (28) is formed with bore openings (51) to receive the rods or rails (19);

and wherein the rapid connect-disconnect couplings comprise locking elements (53) engageable in said bores or openings (51) and formed with locking surfaces (57), and wherein the rods or rails are formed with matching locking surfaces engaging the locking surfaces of the locking elements (53).

16. The system of claim 1, wherein the longitudinally shiftable elongated coupling means comprises a plurality of parallel projecting rods or rails, extending from the injection unit (1) in a direction transversely to said mold engagement plate (16) and parallel to the direction of movement of said injection unit (1) when moved by said operating means (15).

* * * * *